(12) United States Patent
Bouzguarrou et al.

(10) Patent No.: US 10,936,463 B2
(45) Date of Patent: Mar. 2, 2021

(54) APPARATUS AND METHOD FOR DETECTING REGULARITY IN A NUMBER OF OCCURRENCES OF AN EVENT OBSERVED DURING MULTIPLE INSTANCES OF A COUNTING PERIOD

(71) Applicant: Arm Limited, Cambridge (GB)

(72) Inventors: Houdhaifa Bouzguarrou, Valbonne (FR); Guillaume Bolbenes, Antibes (FR); Eddy Lapeyre, Antibes (FR); Luc Orion, Mouans Sartoux (FR)

(73) Assignee: Arm Limited, Cambridge (GB)

( * ) Notice: Subject to any disclaimer, the term of this patent is extended or adjusted under 35 U.S.C. 154(b) by 105 days.

(21) Appl. No.: 16/108,115

(22) Filed: Aug. 22, 2018

(65) Prior Publication Data

US 2020/0065105 A1 Feb. 27, 2020

(51) Int. Cl.
*G06F 11/34* (2006.01)
*G06F 9/00* (2006.01)
(Continued)

(52) U.S. Cl.
CPC ............ *G06F 11/34* (2013.01); *G06F 9/325* (2013.01); *G06F 9/3806* (2013.01);
(Continued)

(58) Field of Classification Search
CPC ...... G06F 9/3832; G06F 9/3844; G06F 11/34; G06F 9/325; G06F 9/3806;
(Continued)

(56) References Cited

U.S. PATENT DOCUMENTS

| 7,136,992 B2* | 11/2006 | Maiyuran | G06F 9/325 |
| | | | 712/241 |
| 2012/0124560 A1* | 5/2012 | Indukuru | G06F 11/3471 |
| | | | 717/127 |

(Continued)

*Primary Examiner* — David J. Huisman
(74) *Attorney, Agent, or Firm* — Nixon & Vanderhye P.C.

(57) ABSTRACT

An apparatus and method are provided for detecting regularity in a number of occurrences of an event observed during multiple instances of a counting period. The apparatus has regularity detection circuitry for seeking to detect such a regularity, and a storage providing a storage entry having a count value field to store a count value and a confidence indication field to indicate a confidence in the regularity. The regularity detection circuitry is arranged to consider the multiple instances of the counting period in pairs, for one instance in a given pair of the pairs the regularity detection circuitry incrementing the count value following each occurrence of the event, and for the other instance in the given pair the regularity detection circuitry decrementing the count value following each occurrence of the event. Check circuitry is then arranged, following completion of both counting periods in the given pair, to adjust the confidence indication to indicate an increased confidence when it is determined that the count value has returned to an initial value, and otherwise to adjust the confidence indication to indicate a decreased confidence and to reset the count value to the initial value. Such an approach provides a particularly storage efficient mechanism for seeking to detect regularity in a number of occurrences of an event.

20 Claims, 12 Drawing Sheets

(51) Int. Cl.
*G06F 9/38* (2018.01)
*G06F 9/32* (2018.01)

(52) U.S. Cl.
CPC .......... *G06F 9/3832* (2013.01); *G06F 9/3844* (2013.01); *G06F 2201/88* (2013.01)

(58) Field of Classification Search
CPC ............. G06F 11/3024; G06F 11/3476; G06F 2201/81; G06F 2201/86; G06F 2201/88
See application file for complete search history.

(56) References Cited

U.S. PATENT DOCUMENTS

2016/0132331 A1* 5/2016 Godard ................. G06F 9/3806
 711/137
2018/0285111 A1* 10/2018 Padmanabha ......... G06F 9/3836

* cited by examiner

| TAG | | | | | | |
|---|---|---|---|---|---|---|
| INSTRUCTION ID | START DATA | STRIDE | COUNT VALUE | ADJUSTMENT DIRECTION | CONFIDENCE /THRESHOLD | SPECULATION COUNT |
| PORTION OF LOAD INSTRUCTION ADDRESS | DV3 | 2 | 8 | | | |

Load Data

DV1

DV2

DV3       ⎫
          ⎬ FIRST USE OF STRIDE
DV4 (DV3 + 2)  ⎤
          ⎦
DV5 (DV3 + 4)

DV6 (DV3 + 6)     8 ACCESSES TO
                  DATA VALUES
                  WITH REGULAR
DV7 (DV3 + 8)     STRIDE OF 2

APPARATUS AND METHOD FOR DETECTING REGULARITY IN A NUMBER OF OCCURRENCES OF AN EVENT OBSERVED DURING MULTIPLE INSTANCES OF A COUNTING PERIOD

BACKGROUND

The present technique relates to an apparatus and method for detecting regularity in a number of occurrences of an event observed during multiple instances of a counting period.

There are a variety of situations where it can be useful to detect regularity in the number of occurrences of an event. For example, once such regularity has been detected, it may be possible to output prediction information to recipient circuitry, in order to influence the operations performed by that recipient circuitry. For instance, in one particular implementation, the detection of regularity in the number of occurrences of an event during a counting period may be used to make branch outcome predictions for branch instructions, which can then be used to influence the instructions fetched for execution by a processor.

However, the structures used to seek to detect regularity in the number of occurrences of an event typically require significant storage needs. For example, it has typically been necessary to maintain a number of separate counters, with a first counter being used to keep track of the number of occurrences of an event observed during a current counting period, and a separate counter being used to provide a comparison count value determined from counting occurrences of the event during previous counting periods. The storage requirements for such regularity detecting structures can in some instances make their use unattractive, and accordingly it would be desirable to provide a more storage efficient mechanism for detecting such regularity.

SUMMARY

In a first example configuration, there is provided an apparatus comprising: regularity detection circuitry to seek to detect regularity in a number of occurrences of an event observed during multiple instances of a counting period; a storage providing a storage entry having a count value field to store a count value and a confidence indication field to indicate a confidence in the regularity; the regularity detection circuitry being arranged to consider the multiple instances of the counting period in pairs, for one instance in the pair the regularity detection circuitry being arranged to increment the count value following each occurrence of the event and for the other instance in the pair the regularity detection circuitry being arranged to decrement the count value following each occurrence of the event; and check circuitry, following completion of both counting periods in the pair, to adjust the confidence indication to indicate an increased confidence when it is determined that the count value has returned to an initial value, and otherwise to adjust the confidence indication to indicate a decreased confidence and to reset the count value to the initial value.

In another example configuration, there is provided a method of detecting regularity in a number of occurrences of an event observed during multiple instances of a counting period, comprising: providing a storage entry having a count value field to store a count value and a confidence indication field to indicate a confidence in the regularity; arranging regularity detection circuitry to consider the multiple instances of the counting period in pairs, for one instance in the pair the regularity detection circuitry incrementing the count value following each occurrence of the event and for the other instance in the pair the regularity detection circuitry decrementing the count value following each occurrence of the event; following completion of both counting periods in the pair: adjusting the confidence indication to indicate an increased confidence when it is determined that the count value has returned to an initial value; and otherwise adjusting the confidence indication to indicate a decreased confidence and resetting the count value to the initial value.

In a yet further example configuration, there is provided an apparatus comprising: regularity detection means for seeking to detect regularity in a number of occurrences of an event observed during multiple instances of a counting period; storage means for providing a storage entry having a count value field to store a count value and a confidence indication field to indicate a confidence in the regularity; the regularity detection means for considering the multiple instances of the counting period in pairs, for one instance in the pair the regularity detection means for incrementing the count value following each occurrence of the event and for the other instance in the pair the regularity detection means for decrementing the count value following each occurrence of the event; and check means, following completion of both counting periods in the pair, for adjusting the confidence indication to indicate an increased confidence when it is determined that the count value has returned to an initial value, and otherwise for adjusting the confidence indication to indicate a decreased confidence and for resetting the count value to the initial value.

BRIEF DESCRIPTION OF THE DRAWINGS

The present technique will be described further, by way of illustration only, with reference to examples thereof as illustrated in the accompanying drawings, in which:

FIG. 10 illustrates the fields provided within a storage of the value prediction circuitry of FIG. 9 in accordance with one example implementation; and FIG. 11 illustrates a sequence of loaded data values, for which a regular difference between adjacent loaded data values can be detected using the value prediction circuitry of FIG. 9.

DESCRIPTION OF EXAMPLES

Figure 1:
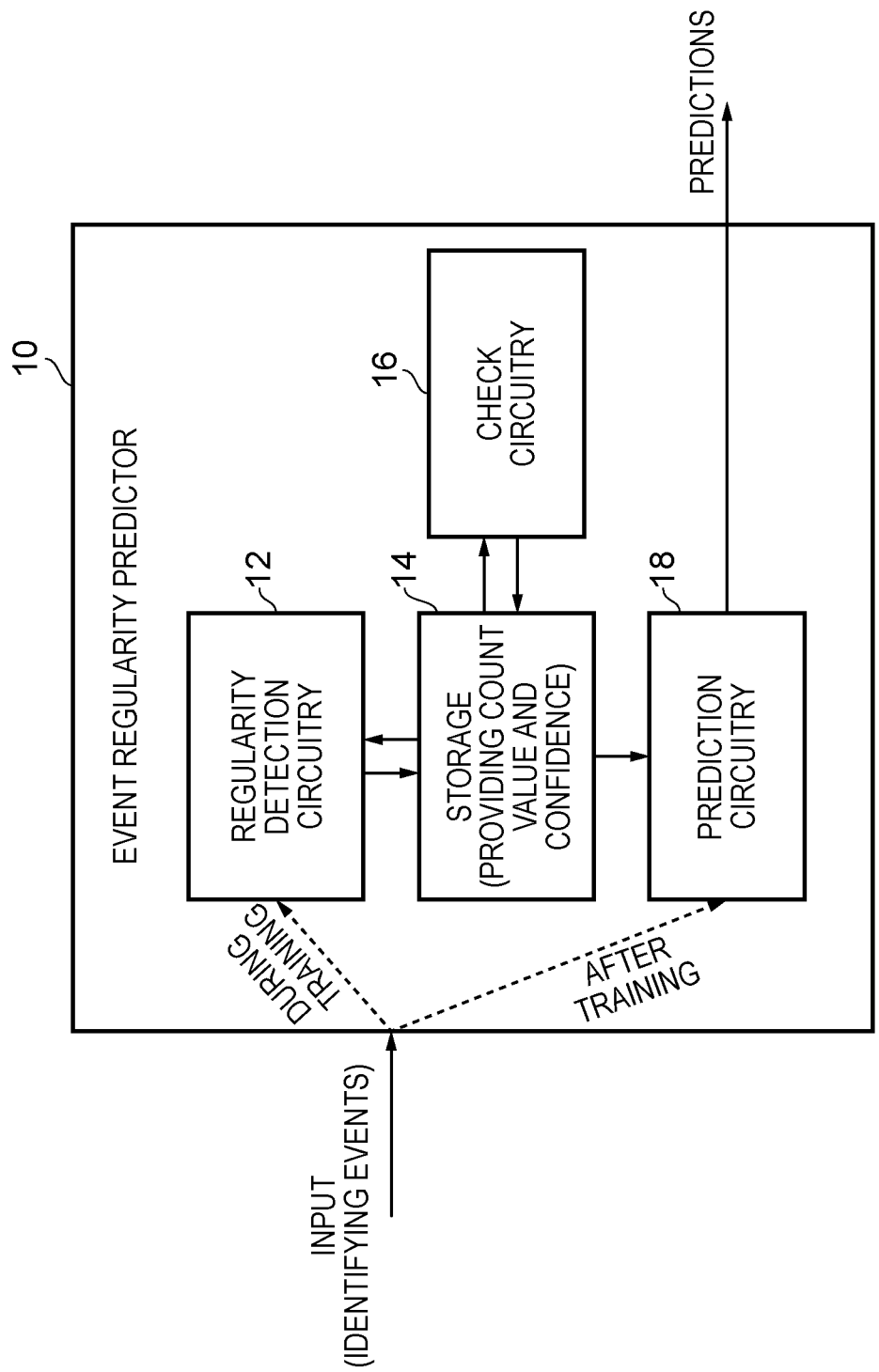
FIG. 1 is a block diagram of an event regularity predictor in accordance with one example arrangement.

In one example arrangement an apparatus is provided that has regularity detection circuitry for seeking to detect regularity in a number of occurrences of an event observed during multiple instances of a counting period. Further, a storage is provided that has a storage entry with a count value field used to store a count value, and a confidence indication field used to indicate a confidence in the regularity. The regularity detection circuitry is arranged to consider the multiple instances of the counting period in pairs. For one instance in the pair the regularity detection circuitry increments the count value following each occurrence of the event, whilst for the other instance in the pair the regularity detection circuitry decrements the count value following each occurrence of the event. Check circuitry is then provided which, following completion of both counting periods in the pair, is arranged to adjust the confidence indication to indicate an increased confidence when it is determined that the count value has returned to an initial value, and otherwise is arranged to adjust the confidence indication to indicate a decreased confidence and to reset the count value to the initial value.

By such an approach, the need for multiple counters during a training phase where the apparatus is seeking to detect regularity in the number of occurrences of the event can be avoided. Instead, by alternating between incrementing the count value during one counting period, and then decrementing the count value during an adjacent counting period, it is possible to employ a single counter during the training operation. After each pair of counting periods has been considered, the check circuitry can determine whether the resultant count value has returned to the initial value, and adjust the confidence indication accordingly. This provides an efficient storage structure for use during a training phase when seeking to detect regularity in the count of events observed during multiple instances of a counting period.

The manner in which the confidence indication is adjusted can be varied dependent on implementation. In one example, when adjusting the confidence indication to indicate an increased confidence, the confidence indication is altered by a predetermined amount each time it is determined that the count value has returned to the initial value. With regards to the adjustment of the confidence indication to indicate a decreased confidence, then in one implementation it would be possible merely to adjust the confidence indication by the predetermined amount in the opposite sense to the adjustment made when seeking to indicate an increased confidence. However, in one particular implementation, rather than merely adjusting the confidence indication in such a manner to indicate a decreased confidence, the check circuitry is instead arranged to reset the confidence indication to a reset value. Hence, in accordance with such an approach, as soon as it is detected that the count value has not returned to the initial value following completion of both counting periods in a pair, the confidence indication is reset.

When a regularity is detected by the apparatus with a sufficient level of confidence, then that information can be used in a variety of ways. However, in one example implementation the apparatus further comprises prediction circuitry arranged, once the confidence indication identifies that a threshold level of confidence has been reached, to use the number of occurrences of the event to make predictions used to influence operations performed by prediction recipient circuitry. By using such predictions to influence the operations performed by the prediction recipient circuitry, the overall efficiency and/or performance of the system can be improved.

In one example implementation, once the confidence indication identifies that a threshold level of confidence has been reached, the regularity detection circuitry is arranged to monitor one further instance of the counting period in order to capture within the count value field the number of occurrences of the event. This provides a particularly efficient mechanism for capturing the number of occurrences of the event once the number of occurrences has been detected as being stable, i.e. when the threshold level of confidence has been reached. In particular, such an approach avoids the need for a separate counter to maintain the total number of occurrences of the event within the counting period.

Due to the fact that the counting periods are considered in pairs, a possible scenario that could arise is that the number of events observed during each counting period in a pair of counting periods could be the same, but might be different to the number of events detected during each of the counting periods in another pair. In implementations where such a scenario is considered as being a possibility, then additional steps can be taken to alleviate the chance of the apparatus detecting a sufficient level of confidence in the regularity of the event count when in fact there have been such differences arising. For instance, in one example implementation the multiple instances of the counting period are chosen from a plurality of sequential occurrences of the counting period so as to omit at least one individual occurrence within the plurality of sequential occurrences. Hence, purely by way of example, if the event count for a series of counting periods was in fact "8, 8, 9, 9, 10, 10, . . . ", then by omitting once occurrence of the counting period within such a plurality of sequential occurrences, the counting periods will be paired in such a manner that the irregularity will be detected, and accordingly the confidence indication will be reset.

In one example implementation, when more than one individual occurrence is omitted, each omitted individual occurrence is non-adjacent to another omitted individual occurrence in the plurality of sequential occurrences. Hence, by such an approach, whilst more than one individual occurrence may be omitted, an adjacent pair of occurrences will not be omitted.

There are a number of ways in which a decision can be taken as to each individual occurrence of the counting period to omit from the counting process. This could for example be determined randomly, or alternatively the omission could occur at periodic intervals.

There are a number of ways in which information can be maintained in order to control whether the regularity detection circuitry increments the count value or decrements the count value during a current counting period. In one example implementation, the storage entry has a direction field used to provide an adjustment direction indicator for the count value, the adjustment direction indicator being reversed following each monitored instance of the counting period. The regularity detection circuitry is then arranged to reference the adjustment direction indicator in order to determine, for a currently monitored instance of the counting period, whether to increment the count value or decrement the count value. This provides a simple and effective mechanism for controlling how the count value is adjusted by the regularity detection circuitry during each counting period.

It will be appreciated that the initial value for the count value is a matter of design choice. Further, whether the count value is incremented or decremented during the first counting period in the pair is also a matter of design choice. However, in one particular example, the initial value is 0, and for a first instance in the pair the regularity detection circuitry is arranged to increment the count value following each occurrence of the event, whilst for a second instance in the pair the regularity detection circuitry is arranged to decrement the count value following each occurrence of the event. In such an example implementation, the check circuitry is then arranged to detect whether the count value has returned to 0 following completion of both counting periods in the pair.

The above described apparatus can be used in a variety of situations where it is considered desirable to detect regularity in the number of occurrences of an event. As such, the events that are observed, and the counting periods during which a count of those events is maintained, will vary dependent on the particular implementation. In one particular example implementation, the apparatus forms loop termination prediction circuitry for maintaining an iteration count value for a loop controlling branch instruction that controls repeated execution of an associated loop comprising a number of instructions, the iteration count value identifying the number of times the loop is to be executed. In such an example, the event being monitored is an iteration of the loop, such that each time an iteration of the loop occurs, the count value is adjusted. The counting period is then considered to be the period between the loop being initiated and the loop being terminated. Accordingly, the regularity detection circuitry is arranged in such an implementation to seek to detect regularity in the number of iterations of the loop in the counting period, thereby detecting whether the loop terminates after a regular number of iterations. In situations where such a regularity can be detected, then this can be used to influence the branch outcome predictions made for subsequent occurrences of the loop controlling branch instruction, and in particular can significantly increase the accuracy of such branch predictions.

In one example implementation, the loop termination prediction circuitry can seek to maintain iteration count value information for a number of different loop controlling branch instructions. For example, the loop termination prediction circuitry may be arranged to maintain an iteration count value for each of a plurality of loop controlling branch instructions, each loop controlling branch instruction being allocated an associated storage entry in the storage. Each storage entry can then include an identifier field to provide an identifier for the loop controlling branch instruction allocated to that entry.

In one example implementation, once the confidence indication identifies that a threshold level of confidence has been reached, then the regularity detection circuitry may be arranged to monitor one further instance of the counting period in order to capture within the count value field the number of iterations of the loop. This provides a particularly efficient mechanism for capturing the total number of iterations of the loop once it has been detected that the iteration count is stable.

In one example implementation, the apparatus further comprises a termination predictor arranged, once the confidence indication identifies that a threshold level of confidence has been reached, to use the identified number of iterations of the loop to make branch outcome predictions for the loop controlling branch instruction that are used to control speculative execution of instructions by processing circuitry. For example, for each occurrence of the loop controlling branch instruction, the termination predictor can predict whether that branch instruction will be taken or not taken, and that information can be used to influence the instructions that are fetched for execution by the processing circuitry.

There are various ways in which information about the number of predictions made by the termination predictor during the period between the loop being initiated and the loop being terminated can be maintained. In one example implementation, the storage entry further comprises a speculation count value that indicates a number of branch outcome predictions that have been made for the associated loop controlling branch instruction during speculative execution of instructions by the processing circuitry.

This information can be useful in certain situations. For example, this information can be used when determining how to reset the state of the processing circuitry in the event that a branch misprediction is made at some point. In particular, at certain checkpoints during execution of program code, the current value of the speculation count can be saved, so that if it subsequently becomes necessary to restore the state of the apparatus to that checkpoint, then the speculation count value can be restored from the saved count value at the checkpoint.

In one example implementation, the branch outcome prediction information maintained in each entry of the loop termination prediction circuitry identifies an outcome pattern for the associated loop controlling branch instruction. This can be used to determine the predicted outcome for each iteration of the loop.

In one implementation, the outcome pattern identifies one of: the loop controlling branch instruction will be taken N times, and then not taken; the loop controlling branch instruction will not be taken N times, and then will be taken.

Hence, by using the outcome pattern, and based on a knowledge of how many predictions have previously been made during an occurrence of the loop, the termination predictor can determine whether to predict a current instance of the loop controlling branch instruction as taken or not taken.

Whilst in the example discussed above the apparatus takes the form of loop termination prediction circuitry, as mentioned earlier the technique described herein can be applied to many different situations, and is not restricted to use in association with loop termination prediction. For example, in another alternative implementation, the apparatus may form value prediction circuitry for maintaining a stride value indicative of a regular difference between the value of a result produced when executing a sequence of occurrences of a determined instruction. The event in this case is an occurrence of the determined instruction whose value of the produced result differs from the value of the produced result for a preceding occurrence of the determined instruction by the stride value. The counting period then considers the sequence of occurrences of the determined instruction for which the same stride value is observed between the results produced for adjacent occurrences of the determined instruction in the sequence. The regularity detection circuitry is then arranged to seek to detect regularity in the number of occurrences of the determined instruction within the sequence. Hence, when a regular difference is detected in the value of the result produced when executing each occurrence of a determined instruction within a sequence, then that information can be used for example to make a prediction as to the result for one or more occurrences of the determined instruction when that sequence is observed again.

In one example implementation, the storage entry is arranged to maintain an indication of an address of the determined instruction, along with the value of the result for a first occurrence of the determined instruction in the sequence. In addition, an indication of the stride value can also be maintained in the storage entry. Further, once the confidence indication identifies that a threshold level of confidence has been reached, the regularity detection circuitry may be arranged to monitor one further instance of the counting period in order to capture within the count value field the number of occurrences of the determined instruction within the sequence. Based on this information, the value prediction circuitry is then in a position to predict the result for occurrences of the determined instruction the next time the sequence is observed.

In particular, in one example implementation the apparatus further comprises a value predictor arranged, once the confidence indication identifies that a threshold level of confidence has been reached, to use the identified number of occurrences of the determined instruction within the sequence to make value predictions for the result for one or more occurrences of the determined instruction, for use by processing circuitry. In particular, when it is subsequently observed that the determined instruction has been encountered, and the result value for that occurrence of the instruction is the value held in the storage entry, then it is determined that a hit has occurred in relation to the storage entry, and that for one or more additional occurrences of the determined instruction the contents of the storage entry can be used to predict the result value. In particular, given the value of the result for the first occurrence, and an indication of the stride value, then for each subsequent occurrence of the determined instruction up to the number of occurrences indicated by the count value, the prediction circuitry can predict the result value by adding a certain multiple of the stride value to the result value for the first occurrence, where the multiple added is dependent on the instance of the determined instruction within the sequence.

Such a value prediction circuit can be used in a variety of situations. However, in one particular example scenario, the determined instruction is a load instruction which, when executed, causes the processing circuitry to issue a load request to cache circuitry, and the value predictor is arranged to make a value prediction for the result of an occurrence of the load instruction within the sequence when the associated load request results in a miss being detected in the cache circuitry. By such an approach, an early indication of the result value can be provided by the value predictor, before the actual data value has been loaded from memory. Accordingly, the processing circuitry can continue to perform subsequent operations on the basis of that predicted result value, and in due course it can be determined whether the predicted result value is the same as the value that is loaded from memory. In the event that it is, then a significant improvement in performance can be realised from use of the predicted result value. In situations where the prediction is not correct, then the activities of the processing circuitry can be rewound to the point where the predicted result value was first used, and the processing circuitry's operations can then be replayed using the actual loaded data value.

Particular examples will now be described with reference to the Figures.

FIG. 1 is a block diagram of an event regularity predictor 10 according to one example implementation. The event regularity predictor 10 is arranged to monitor input signals which include information sufficient to enable each occurrence of an event of interest to be detected, during each of multiple instances of a chosen counting period. The events being monitored, and the associated counting period during which occurrences of the event are counted, will vary dependent on implementation, and there are a wide variety of different events that could potentially be monitored by the event regularity predictor 10. Two particular examples will be discussed in detail later. In accordance with the first example, the event regularity predictor 10 takes the form of loop termination prediction circuitry that is used to determine whether there are a stable number of iterations of a loop each time that that loop is encountered, where the loop contains a number of instructions, and a loop controlling branch instruction is used to control repeated execution of the loop. When a loop has a stable iteration count, then the loop prediction circuitry can be used to make accurate branch outcome predictions for the associated loop controlling branch instruction.

As another example, the event regularity predictor may take the form of a value prediction circuit for predicting the value of a result produced when executing a sequence of occurrences of a determined instruction. In particular, the value prediction circuitry seeks to detect whether there is a regular difference between the value of the result produced when executing such a sequence of occurrences of the determined instruction, and when such a regular difference is observed, the value prediction circuitry can be used subsequently to predict the result value produced for any particular instance of the determined instruction within that sequence.

However, the above two specific examples are merely intended to serve as examples as to the breadth of applicability of the event regularity predictor, and it will be appreciated that a variety of different events could potentially be monitored by such event regularity predictor circuitry, in order to seek to detect whether there is a regularity in the number of occurrences of that event during each instance of an associated counting period.

Considering FIG. 1, the event regularity predictor 10 includes regularity detection circuitry 12 that is used during a training phase to seek to detect whether there is regularity in a number of occurrences of the event observed during multiple instances of a counting period. The input information can be used to detect the start and end of each counting period, and to detect each occurrence of an event during such a counting period.

Storage 14 is provided that has at least one storage entry for maintaining a count value field in which a count value is stored, and a confidence indication field to indicate a confidence in the regularity of the number of occurrences of the event. In one example implementation, the storage may have multiple storage entries, and each storage entry can be allocated for tracking an associated event count.

The regularity detection circuitry 12 may be arranged during the training phase to consider multiple instances of the counting period in pairs. For one instance in the pair, the regularity detection circuitry is arranged to increment the count value following each occurrence of the event, whilst for the other instance in the pair the regularity detection circuitry is arranged to decrement the count value following each occurrence of the event.

Following completion of both counting periods of the pair, check circuitry 16 is then arranged to detect whether the count value has returned to an initial value. The initial value can be chosen dependent on implementation, but in one example implementation the initial value is 0, and accordingly at this point the check circuitry can determine whether the count value held in the count value field has returned to 0. If so, then a confidence indication can be incremented within the confidence indication field to indicate an improved confidence in the regularity of the number of occurrences of the event in each counting period. However, if the count value has not returned to the initial value, then in one example implementation the confidence indication in the confidence indication field is reset.

A threshold value can be maintained for the confidence indication. Once the confidence indication has reached that threshold value, it can be determined that there is a sufficient degree of confidence as to the stability in the number of occurrences of the event observed during each counting period. At that point, one further occurrence of the counting period can be observed, and in particular the count value field can be used to maintain a count value for the number of occurrences of the event observed during that further instance of the counting period. As a result, at the end of that process, the count value field in the storage will maintain the total event count for a counting period, and the training phase will be considered to be completed.

Thereafter, during an active phase, prediction circuitry 18 can be used to monitor the inputs received by the event regularity predictor 10, and to use the contents of the storage entry to make predictions that are output to prediction recipient circuitry (not shown in FIG. 1) in order to influence the operations performed by the prediction recipient circuitry. For example, considering the earlier loop termination prediction example, once a stable total iteration count has been observed for the loop, then each time the associated loop controlling branch instruction is subsequently encountered, the prediction circuitry 18 can be arranged to make a branch outcome prediction for the loop controlling branch instruction, and that prediction can then be used by fetch circuitry (which in this instance forms the prediction recipient circuitry) in order to control the instructions fetched for execution by a processing unit of the apparatus.

Figure 2:
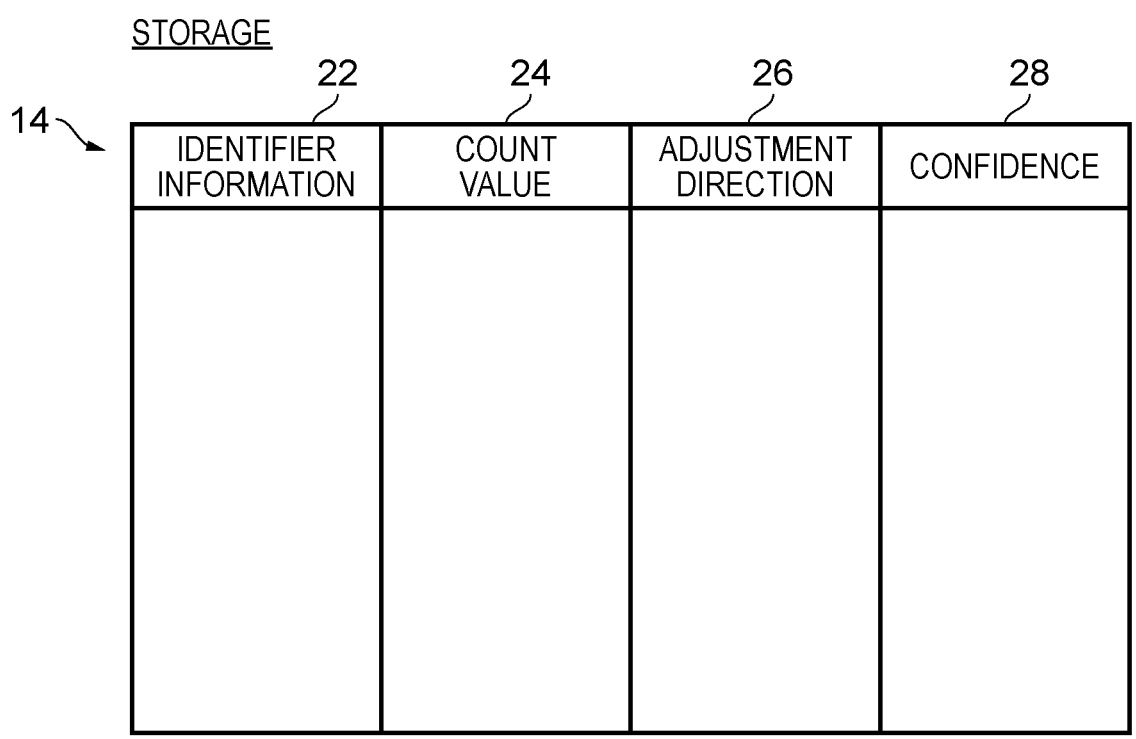
FIG. 2 is a diagram illustrating fields provided within the storage of FIG. 1 in one example arrangement.

FIG. 2 is a diagram illustrating the fields that may be provided within each entry of the storage 14 in one example implementation. An identifier information field 22 is provided to identify what the entry relates to. Typically, this may be a particular instruction, and accordingly the identifier information may comprise a portion of the address used to identify the instruction. Purely by way of example, for the earlier discussed loop termination predictor, the identifier information may be address information identifying a particular loop controlling branch instruction to which the entry relates. For the value predictor example, the identifier information may again include address information used to identify a particular instruction whose result is to be predicted. In some implementations, the identifier information 22 may also include additional information, for example an initial result value observed for a first occurrence of the instruction within a sequence of occurrences for which the value prediction circuitry is to predict the result value.

As shown in FIG. 2, a count value field 24 is also provided in which to maintain the earlier discussed count value. An adjustment direction field 26 is then used to identify whether, for a current counting period, the count value is to be incremented or decremented. As discussed earlier, the counting periods are treated in pairs, and for one counting period in the pair the count value is incremented, whilst for the other counting period in the pair the count value is decremented. Following each counting period, the adjustment direction information in the field 26 can be altered so as to identify an opposite direction of adjustment to be used for a subsequent counting period.

As also shown in FIG. 2, a confidence indication field 28 can be provided for maintaining the confidence indication discussed earlier. This field may also be used to capture information about the threshold value that needs to be reached by the confidence indication before a sufficient degree of confidence is considered to be reached as to the stability of the event count during each counting period.

Figure 3A:
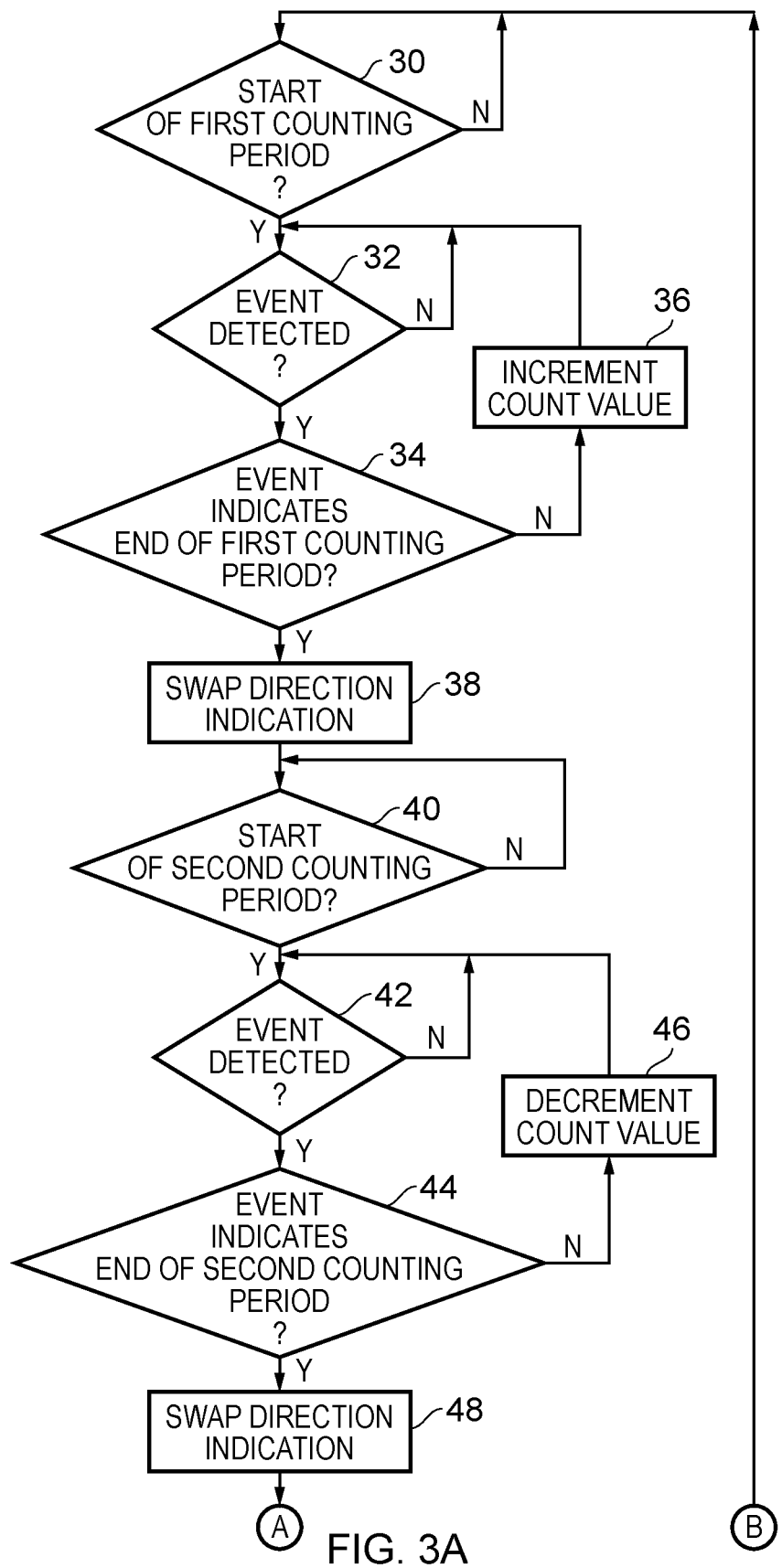
FIGS. 3A and 3B provide a flow diagram illustrating a training operation performed in respect of the event regularity predictor in accordance with one example implementation.
Figure 3B:
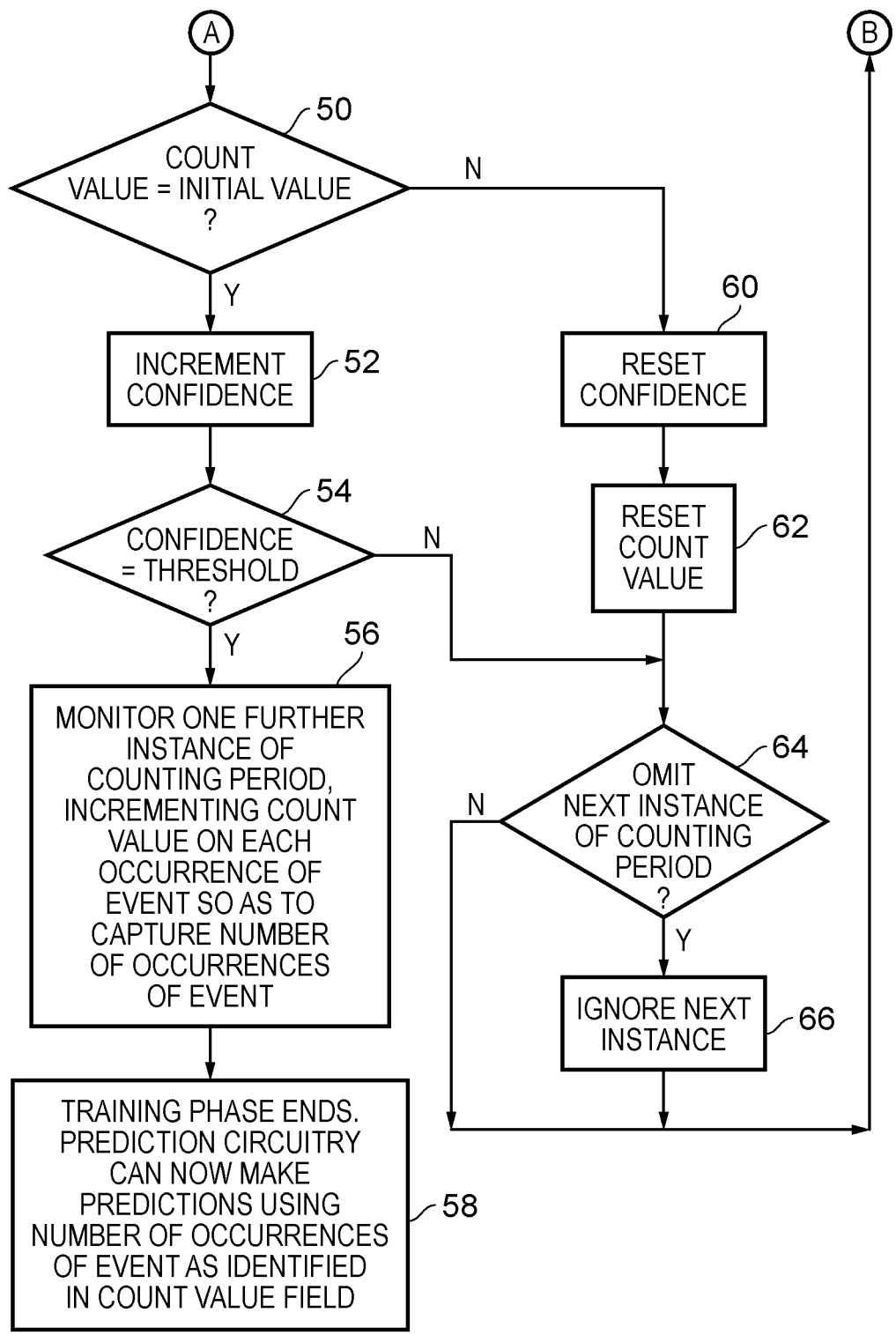

FIGS. 3A and 3B provide a flow diagram illustrating a training phase operation performed in relation to an entry within the storage 14. In particular, once an entry has been allocated (for example to track the event count information associated with a particular instruction for which a prediction is to be made), then as mentioned earlier multiple instances of a counting period are considered, and in particular the counting periods are considered in pairs. At step 30, the start of the first counting period is awaited. Once the first counting period has started, the process proceeds to step 32, where it is determined whether an occurrence of the event has been detected. Once an occurrence of the event has been detected, then at step 34 it is determined whether that event indicates the end of the first counting period, and if not the count value is incremented at step 36, whereafter the process returns to step 32.

This process is repeated, until such time as an event observed at step 34 indicates the end of the first counting period, at which point the process proceeds to step 38 where the direction indication in the adjustment direction field 26 is swapped. This causes the counter to be decremented during the second counting period.

The process then proceeds to step 40 where the start of the second counting period is awaited. Thereafter, the process proceeds to step 42, where it is determined whether an occurrence of the event has been detected. When an occurrence is detected, then at step 44 it is determined whether that event indicates the end of the second counting period, and if not the count value is decremented at step 46, with the process then returning to step 42. Once at step 44 it is determined that an event has been observed that indicates the end of the second counting period, then the process proceeds to step 48 where the direction indication in the adjustment direction field 26 is swapped. This will ensure that on the next occurrence of the counting period, the count value is incremented.

As a result of the steps shown in FIG. 3A, it will be appreciated that the count value in the field 24 will have been incremented on each occurrence of an event during the first counting period, and will then have been decremented on each occurrence of the event during a second counting period. Assuming the same number of occurrences of the event are observed in both of the counting periods, it will be expected that the count value will have been returned to an initial value. The initial value can be chosen dependent on implementation, but as discussed earlier in one example is 0. Accordingly, it is expected at this point that the count value should have returned to 0. This is checked at step 50, where it is determined whether the count value has returned to the initial value, and if so the process proceeds to step 52 where the confidence indication in field 28 is incremented. Thereafter, at step 54, it is determined whether the confidence indication has reached the required threshold level, and if so this means that there is a sufficient degree of confidence as to the regularity of the number of occurrences of the event during each counting period. However, at this point, the count value field 24 will not hold that count information, and accordingly in the example implementation of FIG. 3B, the process proceeds to step 56 where one further instance of the counting period is monitored, with the count value being incremented on each occurrence of the event so as to capture the number of occurrences of the event that arise within the counting period.

Thereafter, at step 58, the training phase ends, whereafter the prediction circuitry 18 is then able to make predictions using the number of occurrences of the event as identified in the count value field 24.

If at step 50, it is determined that the count value does not equal the initial value, then the process proceeds to step 60, where the confidence indication in field 28 is reset to an initial value, for example reset to a 0 value in one example implementation. Further, at step 62, the count value is reset to an initial value, whereafter the process proceeds to step 64.

The process also proceeds to step 64 if at step 54 it is determined that the confidence has not yet reached the threshold. At step 64, it is determined whether to omit the next instance of the counting period. There are a number of techniques that can be used to make this determination. In one particular example, the decision to omit the next instance of the counting period is made randomly, so as to randomly omit one or more instances of the counting period during a sequence of counting periods that are being observed. If it is decided to omit the next instance, then the process proceeds to step 66, where the next instance of the counting period is ignored. In particular, no count value will be maintained during that instance of the counting period, and only after that instance of the counting period has completed will the process then proceed back to step 30 of FIG. 3A, where the next instance of the counting period is considered. However, if at step 64 it is decided not to omit the next instance, then the process proceeds directly from step 64 back to step 30.

A decision as to whether to implement steps 64 and 66 can be made dependent on the particular implementation. However, by incorporating steps 64 and 66, it is possible to alleviate the risk of a perceived stability in the number of occurrences of the event being detected when in fact there is some variation. For example, by considering the counting periods in pairs, if the number of occurrences of the event is stable in each counting period in a pair, but turns out not to be stable across multiple pairs, the above described technique may still enable the required level of confidence to be reached, thereby making an assumption that the total number of occurrences is stable. As a particular example, if for a sequence of counting periods, the event counts are actually "8, 8, 9, 9, 10, 10, . . . ," it will be appreciated that the above described mechanism will detect stability in the iteration count, due to the pairing of counting periods for which the event count is the same. However, by randomly ignoring one instance, the chance of such a scenario arising is significantly reduced.

The event regularity predictor 10 can take a variety of forms. In one particular example arrangement, the event regularity predictor takes the form of a loop termination predictor used as one of the components of branch prediction circuitry, as will be discussed in more detail with reference to FIGS. 4 to 7.

In order to seek to increase the performance of data processing systems, it is known to use branch prediction circuitry to seek to make predictions in respect of branch instructions. The predictions are then used by fetch circuitry to determine the instructions to be fetched from memory for execution by the processing circuitry of the data processing system. In particular, branch instructions can cause a change in flow of the instructions being executed, dependent on whether the branch is taken or not taken. If the system were merely to wait until the processing circuitry has executed the branch instruction (and hence it is known whether the branch is taken or not taken) before fetching the next instructions to be executed, this would have a significant impact on performance. Instead, branch prediction circuitry is used to seek to predict whether a branch will be taken or not taken, so that the fetch circuitry can continue to fetch instructions on the basis of that prediction. If the prediction later proves wrong, then the processing pipeline can be flushed, and processing can be resumed from the point of misprediction.

Figure 4:
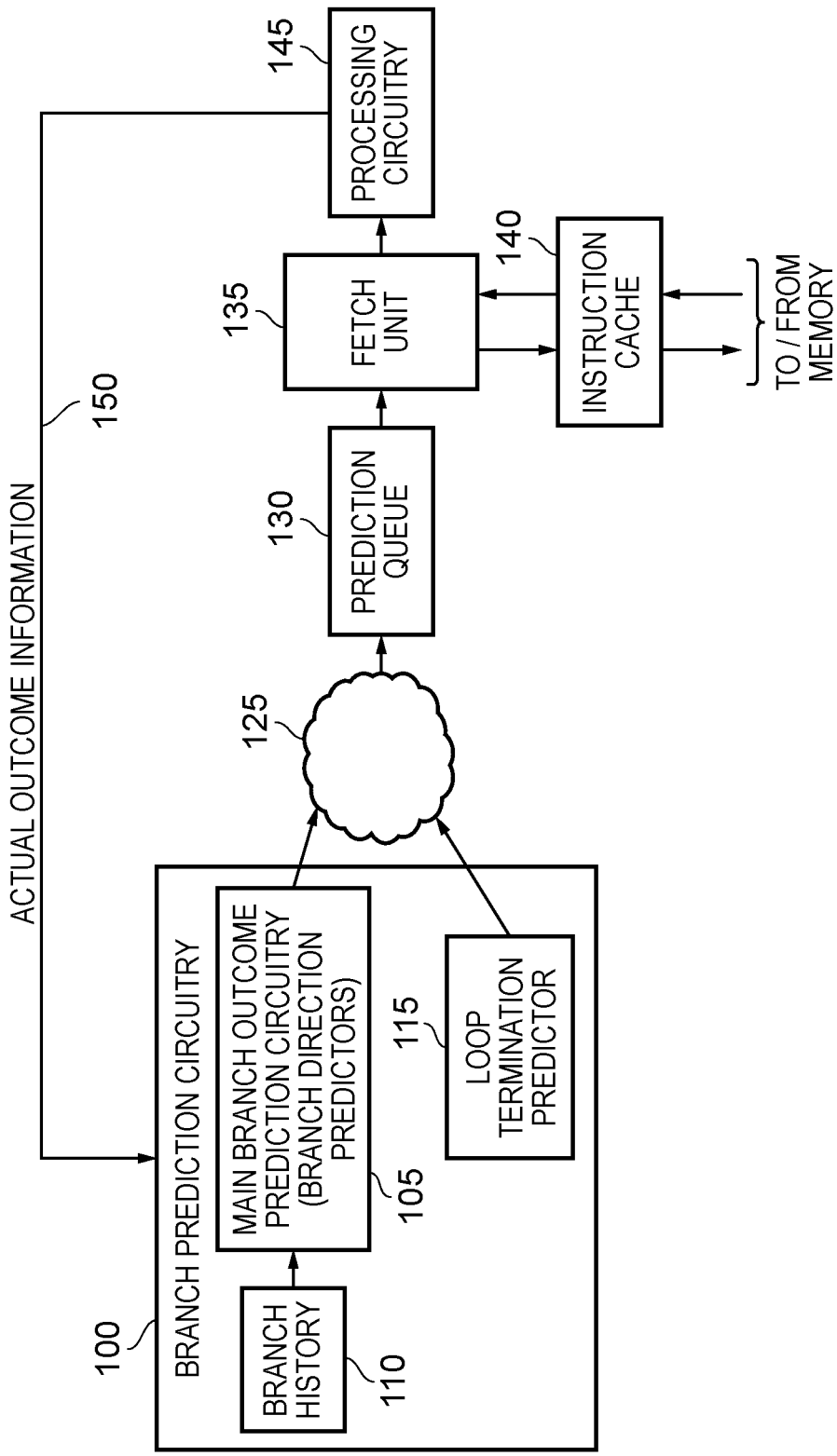
FIG. 4 is a block diagram illustrating an apparatus in accordance with one example.

FIG. 4 is a block diagram of a data processing apparatus in accordance with one example implementation, which uses branch prediction circuitry to predict the outcome of branch instructions. The apparatus includes processing circuitry 145 for executing a sequence of instructions that have been fetched by a fetch unit 135. The fetch unit has access to one or more levels of cache, for example the instruction cache 140 and any lower levels of cache within a cache hierarchy, and initially seeks to fetch instructions from the instruction cache 140. In the event of a cache miss, the requests are propagated to a lower level of the cache hierarchy and/or main memory, in order to retrieve into the fetch unit the instructions that need executing.

Exactly which instructions are fetched by the fetch unit is dictated by the output of a prediction queue 130 which includes storage to maintain a series of prediction results produced by branch prediction circuitry 100, with those prediction results then being analysed to determine a sequence of instructions to be fetched for execution by the processing circuitry. As will be understood by those skilled in the art, when stepping through a sequence of instructions at sequential memory addresses, when a branch instruction is encountered, this can cause a change in instruction flow, dependent on whether the branch instruction is taken or not taken. If the branch is not taken, then the next instruction to be executed will typically be the instruction immediately following the branch instruction (i.e. the one at the next incremented memory address), but if the branch is taken then instruction flow will branch to a target address that is determined for that branch instruction, such that the next instruction to be executed will be an instruction at that target address. Often, branch instructions can be conditional, and hence for any particular conditional branch instruction it will not always be the case that the branch is taken or not taken. Branch prediction circuitry 100 can be used to seek to make predictions as to whether a branch will be taken or not taken, and may include a variety of different types of branch prediction components for use in making such predictions. Often, one or more of those components will operate based on knowledge of the previous history of actual execution by the processing circuitry, with that information being forwarded over path 150 back to the branch prediction circuitry 100.

Often the branch prediction circuitry can be arranged to review blocks of instructions at a time, and each block may for example be referred to as a predict block herein. The predict block will in one implementation include a number of consecutive instructions in the memory address space, for example 8 consecutive instructions. The branch prediction circuitry will seek to analyse the block of instructions in order to predict whether one or more of those instructions are branch instructions, and in the event that they are branch instructions, may seek to provide a prediction as to whether the branch is taken or not taken. This results in the generation of a prediction result for each predict block, which can be routed via combinatorial logic 125 to produce prediction results that are fed into the prediction queue 130. The prediction queue can then analyse these prediction results in order to determine which instructions should be fetched by the fetch unit for execution by the processing circuitry. In the event that the predictions made by the prediction circuitry are accurate, this can significantly improve performance, since the appropriate instructions can be fetched from the instruction cache 140/lower levels of the memory hierarchy in advance of them being required by the processing circuitry, avoiding the need to await the actual outcome of the branch instruction before fetching the next instructions. In the event that a branch prediction proves to be incorrect, then the state of the processing circuitry can be restored to the point prior to the misprediction taking place, and processing can then resume from that point.

In addition to predicting whether a branch will be taken or not taken, which can be referred to as branch direction prediction, the branch prediction circuitry may also perform other forms of branch prediction, for example seeking to predict the target address of a branch that is predicted as taken. However, for the purposes of the following discussion, the discussion of the activities of the branch prediction circuitry will concentrate on the branch direction prediction made by the branch prediction circuitry.

The branch prediction circuitry 100 may include main branch outcome prediction circuitry 105 that can comprise one or more branch direction predictors for seeking to predict a branch outcome of a branch instruction, and in particular whether that branch is predicted as taken or not taken. The predictions made will typically be influenced by the branch history 110 maintained to take into account the actual outcome information obtained from the processing circuitry 145 when branch instructions are executed, and hence taking into account the true taken/not taken behaviour of the branch instructions.

Figure 5A:
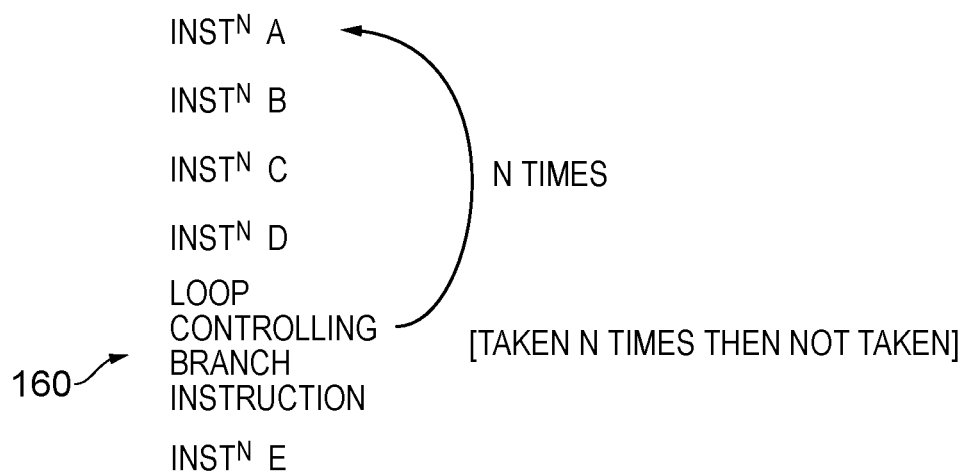
FIGS. 5A and 5B illustrate two different forms of loop controlling branch instruction that may be employed.
Figure 5B:
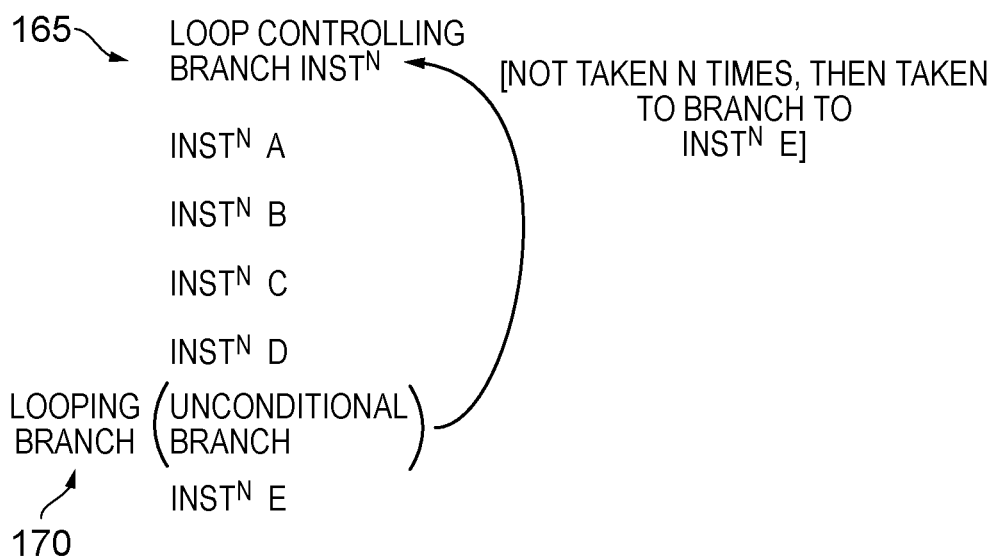

In addition to the main branch outcome prediction circuitry 105, the branch prediction circuitry 100 of FIG. 4 has a loop termination predictor 115 that is used to maintain branch outcome prediction information for one or more loop controlling branch instructions. Each loop controlling branch instruction is a branch instruction that is used to control repeated execution of a loop that comprises a number of instructions. Two examples forms of loop controlling branch instruction are shown in FIGS. 5A and 5B. FIG. 5A illustrates a sequence of instructions at consecutive memory addresses, where a loop controlling branch instruction 160 exists between instruction D and instruction E. When the loop controlling branch instruction is taken, the target address for the loop controlling branch instruction is the address of instruction A, and hence the loop controlling branch instruction identifies that instructions A to D form a loop. Due to the nature of the loop controlling branch instruction 160 it is expected that the loop controlling branch instruction will be taken a significant number of times, and then on the final iteration of the loop will not be taken, such that the next instruction to be executed thereafter will be instruction E. Once the loop has been initiated, the loop controlling branch instruction will be encountered frequently, and a prediction will be made each time for that loop controlling branch instruction. Each time a prediction is made, then the branch history 110 can be updated. This can cause a number of issues for a standard branch direction predictor. Firstly, the branch history will typically be of a finite size, and will quite quickly become heavily influenced by the predictions made in respect of the multiple instances of the loop controlling branch instruction. This can adversely affect the prediction accuracy that can be made with regard to other branch instructions. Further, on the final iteration of the loop controlling branch instruction, the prediction will be wrong, since by that stage it is expected that the normal branch prediction circuitry will predict the loop controlling branch instruction as strongly taken, and accordingly will also predict the loop controlling branch instruction as taken when the final iteration is reached. The loop termination predictor 115 is provided to alleviate the above problems.

In particular, when a misprediction is made using the standard branch prediction circuitry 105 for a branch instruction that has been strongly predicted correctly beforehand, then an entry can be made within the loop termination predictor 115 since it is likely that such a branch instruction will be a loop controlling branch instruction. The loop termination predictor is then arranged to monitor the behaviour of that loop controlling branch instruction for a number of future occurrences of the loop, in order to seek to determine whether a stable number of iterations is observed for the loop. Once there is a certain level of confidence in the stability of the iteration count, then the loop termination predictor can be used to make future predictions each time the loop controlling branch instruction is encountered. In particular, considering the example of FIG. 5A, once for the loop controlling branch instruction 160 there is a threshold level of confidence that the iteration count of the associated loop is stable, then the entry associated with the loop controlling branch instruction 160 within the loop termination predictor can be viewed as an active entry, and thereafter predictions can be made for that loop controlling branch instruction each time the loop is executed. In accordance with the scheme in FIG. 5A, for the first N iterations, the loop termination predictor 115 will predict that the loop controlling branch instruction is taken each time it is encountered, but on a final iteration will predict that the loop controlling branch instruction is not taken.

As shown in FIG. 5B, another form of loop controlling branch instruction is the form 165 which can be provided at the beginning of a loop. In such instances there will typically be an unconditional branch, referred to herein as the looping branch instruction 170, which branches back to the loop controlling branch instruction 165, and hence defines the loop. It can be seen from a comparison of FIGS. 5A and 5B that in both instances the loop is effectively the same, and involves executing instructions A to D during each iteration of the loop. When using the form of loop controlling branch instruction in FIG. 5B, the branch outcome pattern for the loop controlling branch instruction will be different to that for the loop controlling branch instruction 160 of FIG. 5A, in that the loop controlling branch instruction 165 will be not taken N times, and then will be taken on a final iteration.

Figure 6:
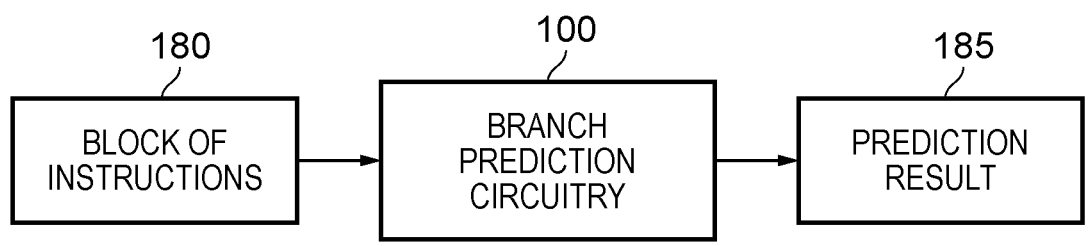
FIG. 6 illustrates how branch prediction circuitry can analyse a block of instructions in order to produce a prediction result.

FIG. 6 illustrates how the branch prediction circuitry 100 can be arranged to consider a block of instructions 180 and produce a prediction result for that block. The block of instructions will typically comprise a plurality of sequentially addressed instructions, and in one particular example is formed of 8 instructions. Starting with the instruction at the first memory address, the branch prediction circuitry seeks to predict whether any of the instructions in the block is a branch instruction, and if so seeks to predict the outcome of that branch instruction. Once a branch instruction is encountered that is predicted as taken, then no further analysis of any subsequent instructions in the block is necessary. The branch prediction circuitry 100 will then produce a prediction result 185 that identifies the instructions within the block that should be executed. In particular, it will identify one or more instructions that are to be executed, starting with the instruction at the first memory address. As soon as a branch instruction is encountered that is predicted as taken, then that forms the last instruction in the sequence to be executed, and is identified as such within the prediction result. The next block of instructions to be analysed by the branch prediction circuitry will in that instance be a sequence of instructions starting with the target address of the branch instruction that was predicted as taken.

From the above discussion, it will be appreciated that where loop controlling branch instructions can be identified, and the associated loop has a stable number of iterations, a more accurate prediction in respect of those loop controlling branch instructions can be made by the loop termination predictor 115, and its output can be used in preference to any prediction made by the main branch outcome prediction circuitry 105 for that branch instruction.

As mentioned earlier, the loop termination predictor 115 can take the form of the event regularity predictor discussed earlier. In this instance, the event being counted is an iteration of the loop, and the counting period during which a count of the number of iterations is detected is a period between the loop being initiated and the loop being terminated (referred to herein as an occurrence of the loop).

Figure 7:
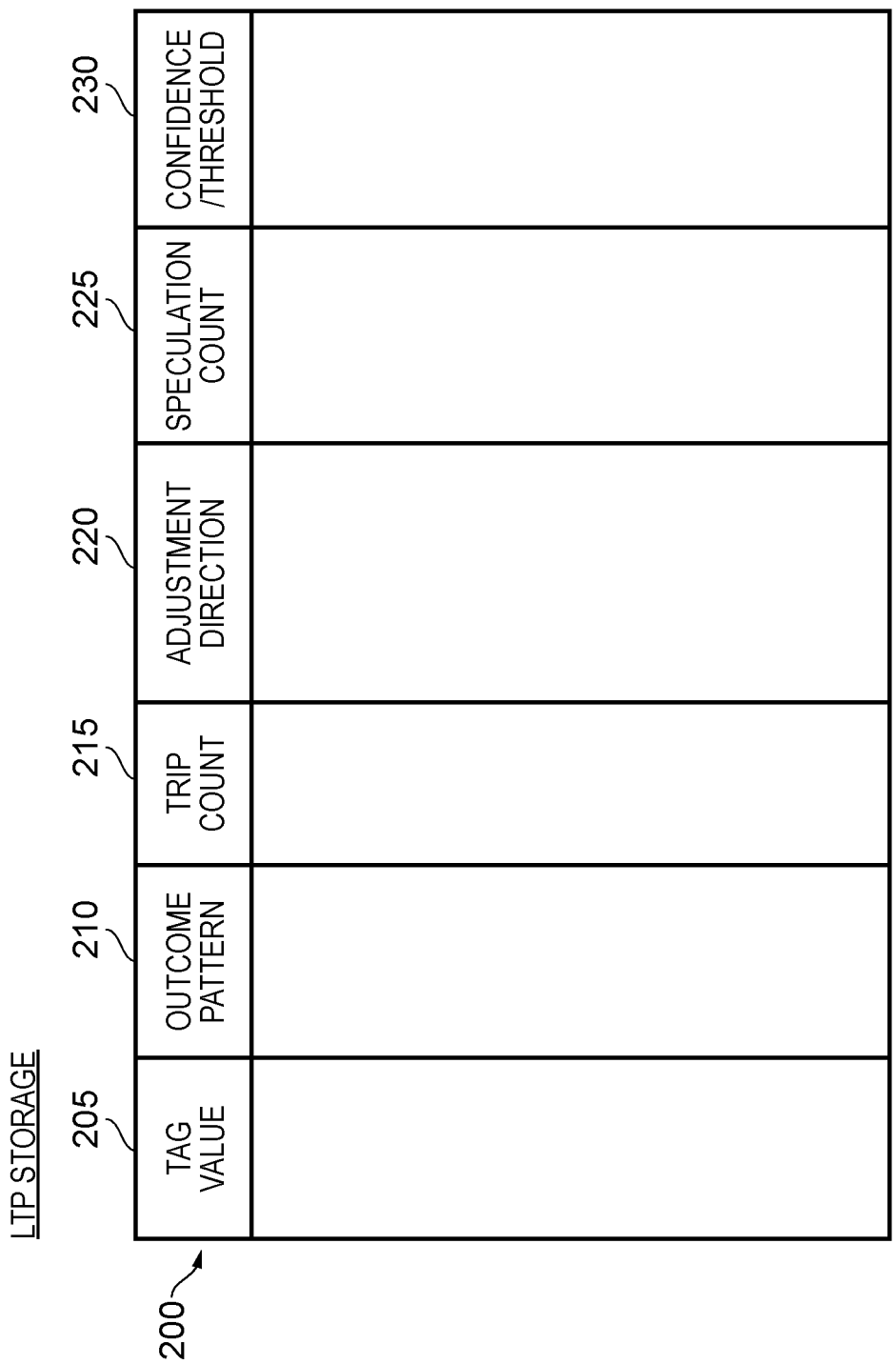
FIG. 7 illustrates the content of entries within the storage of the loop termination predictor of FIG. 4 in accordance with one example.

FIG. 7 is a block diagram illustrating various fields that can be provided within predictor storage 200 of the loop termination predictor 115 in accordance with one example arrangement. A tag value field 205 is used to identify the loop controlling branch instruction that is associated with that entry, typically by storing a certain portion of the memory address of that instruction. The outcome pattern 210 is used to identify whether the associated loop controlling branch instruction is to be predicted as taken for all iterations except the final iteration, or to be predicted as not taken for all iterations except the final iteration.

The trip count field 215 is used to identify the total number of iterations of the loop that occur between the loop being initiated and the loop being terminated, and during a training phase the loop termination predictor 115 is arranged to seek to determine whether that total iteration count is stable, when considering multiple occurrences of the loop. During the training phase, each counting period (occurrence of the loop) is paired with another counting period, and the count value within the trip count field 215 is adjusted as per the mechanism discussed earlier with reference to FIGS. 3A and 3B. The adjustment direction value in the adjustment direction field 220 is used to determine, for a current counting period, whether the count value is incremented or decremented for each iteration of the loop.

Following completion of each pair of counting periods, the check circuitry 16 detects whether the count value in the trip count field 215 has returned to an initial value. In one example implantation, the initial value is zero, and accordingly at this point the checking circuitry determines whether the trip count has returned to zero. If it has, then a confidence value maintained within the confidence indication field 230 is incremented and a determination is made as to whether the adjusted confidence has yet reached a threshold value (at which point confidence in the stability of the total iteration count is considered high enough to allow predictions to begin to be made). In contrast, if it is detected that the value has not returned to the initial value, then the confidence value in the field 230 is reset in one example implementation.

In one implementation, the threshold can be increased each time the confidence is reset, so as to increase the number of times a stable iteration count needs to be observed before the confidence is considered high enough to start making predictions.

Once it is detected that the confidence value has reached an indicated threshold, then as per step 56 of FIG. 3B, one further occurrence of the loop is monitored, with the count value in the trip count field 215 being incremented on each iteration of the loop, so as to capture the total number of iterations. At this point, the training phase is complete, and the trip count field 215 stores an indication of the total number of iterations, thereby providing the information required to enable predictions to be made when the associated loop controlling branch instruction is subsequently encountered.

In particular, on a subsequent occurrence of the loop, the loop termination predictor can make a prediction as to the outcome of the loop controlling branch instruction for each iteration. Each time such a prediction is made, then the speculation count 225 is incremented, so as to keep track of the total number of predictions that have been made. This information can be used when determining how to reset the state of the processing circuitry in the event that a branch misprediction is made by the branch prediction circuitry 100 at some point. In particular, at certain checkpoints during execution of the code, the current value of the speculation count can be saved, so that if it subsequently becomes necessary to restore the state of the processing circuitry to a particular checkpoint, then the speculation count value 225 can be overwritten with the saved speculation count value from that checkpoint.

It will be appreciated that the above described form of loop termination predictor provides a particularly storage efficient solution, enabling only a single count value to be maintained during the training phase, and thereby reducing the overall storage requirements of the loop termination predictor. In one particular modelled example, it has been found that a 45% reduction in the storage requirements can be achieved when compared with an implementation that maintains a separate count value for each occurrence of the loop during a training phase, with that count value then being compared with the total count value held in the trip count field after each occurrence of the loop has taken place in order to detect whether the iteration count is stable.

Figure 8:
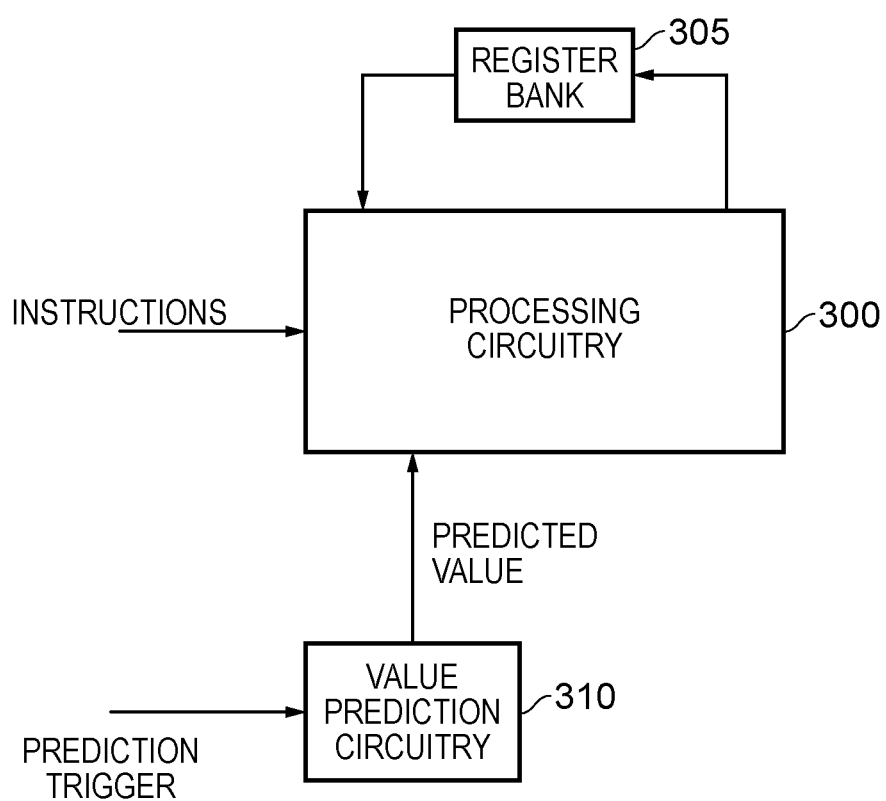
FIG. 8 is a block diagram illustrating an apparatus in accordance with an alternative example implementation.

FIG. 8 illustrates another example use case for the event regularity predictor 10, in this case the event regularity predictor taking the form of value prediction circuitry 310. In accordance with this example, processing circuitry 300 is arranged to execute a sequence of instructions, and during the execution of the instructions the processing circuitry has access to a register bank 305 for storing operand values for the instructions. In particular, it is often the case that an instruction will specify one or more registers whose contents form source operands for the instruction, and will also often identify a register into which the result produced by the instruction is to be written. It is often the case that the source operands for one or more instructions are formed by the results produced by previous instructions, and sometimes certain of the operations that need to be performed by the processing circuitry may be delayed whilst waiting for a result value to be produced during execution of a particular instruction, where that result value is needed as an input operand for such subsequent operations. In certain situations, the value prediction circuitry 310 may be able to predict the result value, and accordingly upon receipt of a prediction trigger can output that predicted value to the processing circuitry 300 to allow the processing circuitry to begin to perform those subsequent operations before the actual result value has been produced.

In due course, it can be detected whether the actual result value matches the predicted result value, and if so it will be appreciated that a performance improvement can be realised by relying on the predicted value to facilitate one or more computations being performed earlier than they would otherwise be able to be performed. If instead it is determined that the predicted value was incorrect, then the state of the processing circuitry can be rewound to the point where the predicted value was used, and instead these operations can be replayed using the actual result value. Provided the predicted values are accurate a sufficient amount of the time, such an approach can lead to significantly increased performance.

There are a number of different scenarios where such a value prediction circuit 310 could be used. For example, entries in the value prediction circuitry could be made for general data processing instructions, provided a suitable prediction trigger can be used to determine when to provide predicted result values for such data processing instructions. Alternatively, the entries in the value prediction circuitry could be used in association with store instructions, for example to enable the result data to be predicted before the actual result data is computed, so that any subsequent dependent instructions could use the predicted store data to enable a performance improvement in the event that the predicted store data is correct. However, for the purposes of the following example, it will be assumed that the value prediction circuitry is used to maintain prediction information for load instructions that are used to load data values from memory into registers of the register bank 305. Such an example implementation is shown in FIG. 9.

Figure 9:
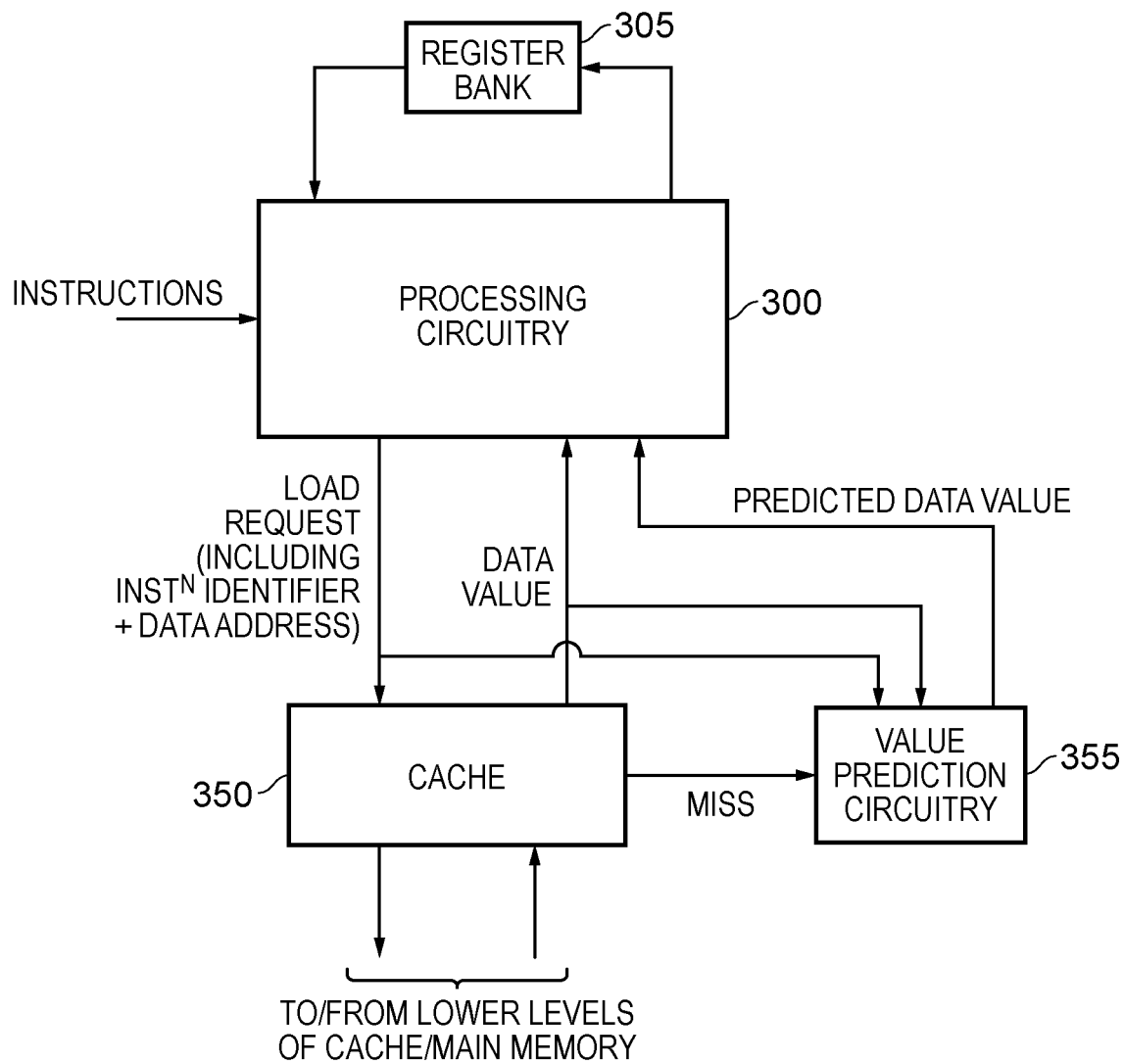
FIG. 9 is a block diagram illustrating an apparatus in accordance with a particular example implementation of the approach illustrated in FIG. 8.

In particular, as shown in FIG. 9, the value prediction circuitry 355 is provided in association with a cache structure 350. The processing circuitry 300 executes a sequence of instructions, that sequence including one or more load instructions. Each load instruction will cause a load request to be output to the cache 350 identifying a data address in memory for a data value to be loaded into a target register of the register bank 305 (the target register being specified by the load instruction). The load request will typically also include an instruction identifier identifying the load instruction that has caused the load request to be issued. If the requested data already resides within the cache 350, then it can be returned directly to the processing circuitry 300. However, in the event of a cache miss occurring for the load request, then the load request needs to be propagated onto one or more lower levels or cache and/or main memory, and in that event there can be a significant delay before the data value is returned via the cache 350 to the processing circuit 300.

The aim of the value prediction circuitry 355 is to seek to determine whether predicted data values can be generated in such situations, so as to allow the processing circuitry to continue performing operations that are dependent upon the loaded data value, in anticipation of the predicted data value matching the actual loaded data value. In particular, when a miss is detected in the cache 350, this can be signalled to the value prediction circuitry 355. If the value prediction circuitry has an active entry for the associated load instruction, then it can be arranged to generate a predicted data value to provide back to the processing circuitry 300. An active entry will be one for which the earlier described training phase has been completed, and hence for which there is predicted stability in the event count during a counting period.

In this example, the "event" is an occurrence of the load instruction in question, whose value of the produced result differs from the value of the produced result for a preceding occurrence of that load instruction by a particular stride value. The counting period is then equated to the sequence of occurrences of the load instruction for which the same stride value is observed between the results produced for adjacent occurrences of the determined instruction in the sequence. This is illustrated schematically in FIG. 11. In particular, FIG. 11 illustrates a sequence of data values that are loaded when executing multiple instances of a particular load instruction. Hence, each of the data values shown in FIG. 11 has been loaded as a result of the same load instruction, but for multiple separate instances of that load instruction within the sequence of instructions being executed by the processing circuitry.

It is assumed in this instance that there is no observable correlation between the data values DV1, DV2 and DV3. However, when the data value DV4 is produced, it is noted that that data value differs from the data value DV3 by 2, and hence the value 2 is a potential stride value. It is then observed that each of the subsequent loaded data values DV5, DV6, DV7, through to DV11 each differ from the preceding loaded data value by 2, and accordingly there are eight accesses to data values with a regular stride of 2. Thereafter, it is assumed that the next loaded data value DV12 does not exhibit the regular stride, and accordingly in this particular example scenario the counting period starts with the instance of the load instruction that causes the data value DV3 to be loaded, and the counting period ends on loading the data value DV12.

The manner in which this information can be maintained within storage of the value prediction circuitry 355 is illustrated in FIG. 10. In particular, FIG. 10 illustrates a variety of fields that may be provided within each entry of storage 400 provided within the value prediction circuitry 355. A first field 405 is used to maintain an instruction identifier, and hence for example may contain a portion of the load instruction address of a load instruction that has been allocated an entry in the storage 400. The start data field 410 is used to identify the result data observed at the start of the counting period, and in the example of FIG. 11 will hence store the data value DV3. The stride field 415 is used to identify the stride value that is a regular stride observed during the counting period, and hence in the example of FIG. 11 will have a value of 2.

The count value field 420 is used to maintain the count information for the number of occurrences of the event within the counting period, and the adjustment direction field 425 is used to determine whether the count value is incremented or decremented during a particular occurrence of the counting period within a pair of counting periods. With reference to the example of FIG. 11, it is hence expected that the count value will be incremented by 0 to 8, and then back down to 0, during each pair of counting periods, assuming that there is an observed regularity in the number of events within the counting period. The confidence/threshold field 430 then maintains the confidence and associated threshold information, and the speculation count field 435 is used to keep track of the number of predictions made during a particular counting period, once the entry is considered an active entry, and accordingly the training phase discussed earlier with reference to FIGS. 3A and 3B has been completed.

Returning to FIG. 9, then in one example implementation, if a miss is detected within the cache 350 for a load request triggered by execution of a particular load instruction, and the value prediction circuitry does not already contain an entry for that load instruction, then an entry can be allocated at that point, and the training phase initiated. During the training phase, subsequent load requests made by the processing circuitry on executing further instances of that load instruction will be observed, as will the returned data value routed via the cache 350 to the processing circuitry 300. This will enable the event count information to be tracked during each counting period.

Considering one particular scheme, then when an entry is allocated, the instruction ID field 405 will be populated with the relevant portion of the instruction address for the load instruction, and the start data field 410 will be populated with the data value returned for that particular instance of the load instruction. All the other fields will be initialised to 0, except for the adjustment direction field 425 which will initially be set to a value (which could also for example be 0) to identify that the count value should be incremented.

On the next occurrence of the load instruction, the returned data value will be observed, and the difference between that data value and the data value stored in the start data field will be detected. That difference will then be stored as the stride value within the stride value field 415, and the count value will be incremented. At this point, the confidence indication in the field 430 will be left at 0.

For each subsequent occurrence of the load instruction, if the regular stride value is detected, the count value will be incremented. Once the regular stride stops being observed, then it will be considered that the counting period has ended, and the training phase will wait for the next occurrence of the counting period. The next occurrence will occur when the load instruction is next encountered, and results in the loading of the same data value stored within the start data field 410. The above described process will then be repeated for each subsequent occurrence of the load instruction, but in this case the count value will be decremented rather than incremented. Once an occurrence of the load instruction is encountered where the loaded data value does not differ from the preceding loaded data value by the stride value, then the counting period is again considered to have ended, and at that point the check circuitry can determine whether the count value has returned to 0. If so, then the confidence can be incremented. This process can be repeated until the confidence value reaches the desired threshold, at which point the entry becomes an active entry that can be used for subsequent prediction purposes.

From the above described implementation, it will be appreciated that the instruction ID field 405 and start data field 410 collectively form a tag value that is used to identify whether there is a hit within the associated entry of the value prediction circuitry storage 400. Accordingly, once the entry becomes an active entry, then if a cache miss is detected for a load instruction that matches with the instruction ID in the field 405, and the loaded data value is the same as the start data held in the start data field 410, then for each subsequent occurrence of the load instruction, up to the maximum number of occurrences identified by the count value, a predicted result value can be generated by incrementing the start data value in the field 410 by the relevant multiple of the stride value in the field 415, on each occurrence of the load instruction.

In the above example of FIG. 9, it will be hence be appreciated that a miss indication from the cache 350 can serve as both an allocation trigger for allocating an entry in the value prediction storage, and subsequently as a prediction trigger for detecting when the value prediction circuitry can be used to output a predicted data value to the processing circuitry 300.

From the above described examples, it will be appreciated that the present technique provides a storage efficient form of event regularity predictor, in particular reducing the storage requirements during a training phase of the predictor when seeking to detect whether there is a regularity in the number of occurrences of an event observed during multiple instances of the counting period. The mechanism can be deployed in a wide variety of different situations where it is desired to track regularity in occurrences of particular events, for example to allow that information to be used to make predictions used to influence operations performed by components of a data processing system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   regularity detection circuitry to seek to detect regularity in a number of occurrences of an event observed during multiple instances of a counting period;
   a storage providing a storage entry having a count value field to store a count value and a confidence indication field to indicate a confidence in the regularity;
   the regularity detection circuitry being arranged to consider the multiple instances of the counting period in pairs, for one instance in a given pair of the pairs the regularity detection circuitry being arranged to increment the count value following each occurrence of the event and for the other instance in the given pair the regularity detection circuitry being arranged to decrement the count value following each occurrence of the event; and
   check circuitry, following completion of both counting periods in the given pair, to adjust the confidence indication to indicate an increased confidence when it is determined that the count value has returned to an initial value, and otherwise to adjust the confidence indication to indicate a decreased confidence and to reset the count value to the initial value.

2. An apparatus as claimed in claim 1, wherein the check circuitry is arranged, when adjusting the confidence indication to indicate a decreased confidence, to reset the confidence indication to a reset value.

3. An apparatus as claimed in claim 1, further comprising:
prediction circuitry arranged, once the confidence indication identifies that a threshold level of confidence has been reached, to use the number of occurrences of the event to make predictions used to influence operations performed by prediction recipient circuitry.

4. An apparatus as claimed in claim 1, wherein once the confidence indication identifies that a threshold level of confidence has been reached, the regularity detection circuitry is arranged to monitor one further instance of the counting period in order to capture within the count value field the number of occurrences of the event.

5. An apparatus as claimed in claim 1, wherein the multiple instances of the counting period are chosen from a plurality of sequential occurrences of the counting period so as to omit at least one individual occurrence within the plurality of sequential occurrences.

6. An apparatus as claimed in claim 5, wherein when more than one individual occurrence is omitted, each omitted individual occurrence is non-adjacent to another omitted individual occurrence in the plurality of sequential occurrences.

7. An apparatus as claimed in claim 1, wherein:
the storage entry has a direction field used to provide an adjustment direction indicator for the count value, the adjustment direction indicator being reversed following each monitored instance of the counting period; and
the regularity detection circuitry is arranged to reference the adjustment direction indicator in order to determine, for a currently monitored instance of the counting period, whether to increment the count value or decrement the count value.

8. An apparatus as claimed in claim 1, wherein:
the initial value is 0;
for a first instance in the given pair the regularity detection circuitry is arranged to increment the count value following each occurrence of the event;
for a second instance in the given pair the regularity detection circuitry is arranged to decrement the count value following each occurrence of the event; and
the check circuitry is arranged to detect whether the count value has returned to 0 following completion of both counting periods in the given pair.

9. An apparatus as claimed in claim 1, wherein:
the apparatus forms loop termination prediction circuitry for maintaining an iteration count value for a loop controlling branch instruction that controls repeated execution of an associated loop comprising a number of instructions, the iteration count value identifying the number of times the loop is to be executed;
the event is an iteration of the loop;
the counting period is a period between the loop being initiated and the loop being terminated; and
the regularity detection circuitry is arranged to seek to detect regularity in a number of iterations of the loop in the counting period, thereby detecting whether the loop terminates after a regular number of iterations.

10. An apparatus as claimed in claim 9, wherein:
the loop termination prediction circuitry is arranged to maintain an iteration count value for each of a plurality of loop controlling branch instructions, each loop controlling branch instruction being allocated an associated storage entry in the storage; and
each storage entry includes an identifier field to provide an identifier for the loop controlling branch instruction allocated to that entry.

11. An apparatus as claimed in claim 9, wherein:
once the confidence indication identifies that a threshold level of confidence has been reached, the regularity detection circuitry is arranged to monitor one further instance of the counting period in order to capture within the count value field a number of iterations of the loop.

12. An apparatus as claimed in claim 9, further comprising:
a termination predictor arranged, once the confidence indication identifies that a threshold level of confidence has been reached, to use an identified number of iterations of the loop to make branch outcome predictions for the loop controlling branch instruction that are used to control speculative execution of instructions by processing circuitry.

13. An apparatus as claimed in claim 12, wherein the storage entry further comprises:
a speculation count value that indicates a number of branch outcome predictions that have been made for an associated loop controlling branch instruction during speculative execution of instructions by the processing circuitry.

14. An apparatus as claimed in claim 12, wherein the storage entry is arranged to identify an outcome pattern for an associated loop controlling branch instruction that is used by the termination predictor when generating each branch outcome prediction.

15. An apparatus as claimed in claim 14, wherein the outcome pattern identifies one of:
the associated loop controlling branch instruction will be taken N times, and then not taken; and
the associated loop controlling branch instruction will not be taken N times, and then will be taken.

16. An apparatus as claimed in claim 1, wherein:
the apparatus forms value prediction circuitry for maintaining a stride value indicative of a regular difference between the value of a result produced when executing a sequence of occurrences of a determined instruction;
the event is an occurrence of the determined instruction whose value of the produced result differs from the value of the produced result for a preceding occurrence of the determined instruction by the stride value;
the counting period considers the sequence of occurrences of the determined instruction for which the same stride value is observed between the results produced for adjacent occurrences of the determined instruction in the sequence; and
the regularity detection circuitry is arranged to seek to detect regularity in the number of occurrences of the determined instruction within the sequence.

17. An apparatus as claimed in claim 16, wherein:
the storage entry is arranged to maintain an indication of an address of the determined instruction, the value of the result for a first occurrence of the determined instruction in the sequence, and an indication of the stride value; and
once the confidence indication identifies that a threshold level of confidence has been reached, the regularity detection circuitry is arranged to monitor one further instance of the counting period in order to capture within the count value field the number of occurrences of the determined instruction within the sequence.

18. An apparatus as claimed in claim 16, further comprising:
a value predictor arranged, once the confidence indication identifies that a threshold level of confidence has been reached, to use the identified number of occurrences of the determined instruction within the sequence to make value predictions for the result for one or more occurrences of the determined instruction, for use by processing circuitry.

19. An apparatus as claimed in claim 18, wherein the determined instruction is a load instruction which, when executed, causes the processing circuitry to issue a load request to cache circuitry, and the value predictor is arranged to make a value prediction for the result of an occurrence of the load instruction within the sequence when the associated load request results in a miss being detected in the cache circuitry.

20. A method of detecting regularity in a number of occurrences of an event observed during multiple instances of a counting period, comprising:
   providing a storage entry having a count value field to store a count value and a confidence indication field to indicate a confidence in the regularity;
   arranging regularity detection circuitry to consider the multiple instances of the counting period in pairs, for one instance in a given pair of the pairs the regularity detection circuitry incrementing the count value following each occurrence of the event and for the other instance in the given pair the regularity detection circuitry decrementing the count value following each occurrence of the event; and
following completion of both counting periods in the given pair:
   adjusting the confidence indication to indicate an increased confidence when it is determined that the count value has returned to an initial value; and
   otherwise adjusting the confidence indication to indicate a decreased confidence and resetting the count value to the initial value.

* * * * *